United States Patent
Wernicke et al.

(10) Patent No.: US 10,394,220 B2
(45) Date of Patent: Aug. 27, 2019

(54) CONTROL SYSTEM FOR A CRANE

(71) Applicant: Terex Global GmbH, Schaffhausen (CH)

(72) Inventors: Frank Wernicke, Stambach (DE); Uwe Henzelmann, Eppenbrunn (DE)

(73) Assignee: TEREX GLOBAL GMBH, Schaffhausen (CH)

( * ) Notice: Subject to any disclaimer, the term of this patent is extended or adjusted under 35 U.S.C. 154(b) by 312 days.

(21) Appl. No.: 15/422,919

(22) Filed: Feb. 2, 2017

(65) Prior Publication Data

US 2017/0227948 A1   Aug. 10, 2017

(30) Foreign Application Priority Data

Feb. 4, 2016   (DE) .................. 10 2016 201 713

(51) Int. Cl.
| | | |
|---|---|---|
| G05B 19/409 | (2006.01) | |
| H04W 4/80 | (2018.01) | |
| H04W 84/12 | (2009.01) | |
| H04B 1/3827 | (2015.01) | |

(52) U.S. Cl.
CPC .. *G05B 19/409* (2013.01); *G05B 2219/31156* (2013.01); *G05B 2219/33192* (2013.01); *H04B 1/3833* (2013.01); *H04W 4/80* (2018.02); *H04W 84/12* (2013.01)

(58) Field of Classification Search
USPC .......................................... 701/50
See application file for complete search history.

(56) References Cited

U.S. PATENT DOCUMENTS

| | | | |
|---|---|---|---|
| 2005/0132104 A1* | 6/2005 | Brown ............... | G05B 19/4185 710/36 |
| 2008/0165025 A1 | 7/2008 | Morath | |
| 2008/0227500 A1* | 9/2008 | Heyworth .......... | G06Q 30/0267 455/566 |
| 2014/0278078 A1* | 9/2014 | Cameron ................ | B66C 13/46 701/480 |

(Continued)

FOREIGN PATENT DOCUMENTS

| | | |
|---|---|---|
| DE | 10129189 A1 | 1/2003 |
| DE | 202006017729 U1 | 4/2008 |

(Continued)

OTHER PUBLICATIONS

Fassi Gru Tv, "Fassi SmartApp system: tecnology, innovation and crane remote assistance" (https://www.youtube.com/watch?v=xkWCavvS6el), Feb. 2014.

(Continued)

*Primary Examiner* — Tyler D Paige
(74) *Attorney, Agent, or Firm* — Browdy and Neimark, PLLC

(57) ABSTRACT

A control system for a crane comprises a mobile terminal, with pre-installed application software for entering a control command for a crane and with a transmitting module for transmitting the control command, a control unit with a receiving module which is suitable for receiving the control command and is capable of being brought into signal linkage with the mobile terminal, the signal linkage being wireless, and at least one crane module in signal linkage with the control unit, for executing the control command.

9 Claims, 1 Drawing Sheet

(56) References Cited

U.S. PATENT DOCUMENTS

2015/0160819 A1* 6/2015 Hwang ............... G06F 3/04817
                                                                        715/769
2016/0311664 A1* 10/2016 Harkonen ............... B66C 15/06
2017/0227948 A1* 8/2017 Wernicke ............. G05B 19/409

FOREIGN PATENT DOCUMENTS

| EP | 2489625 A1 | 8/2012 |
| EP | 2570380 A1 | 3/2013 |
| WO | 2014041022 A2 | 3/2014 |
| WO | 2015/086912 A1 | 6/2015 |

OTHER PUBLICATIONS

Krzysztof Pietrusewicz et al., "Gestures can control cranes | Control Engineering" (http://www.controleng.com/single-article/gestures-can-control-cranes/5a2880a8e115c42e29be634ccc52b588.html) (2014).

* cited by examiner

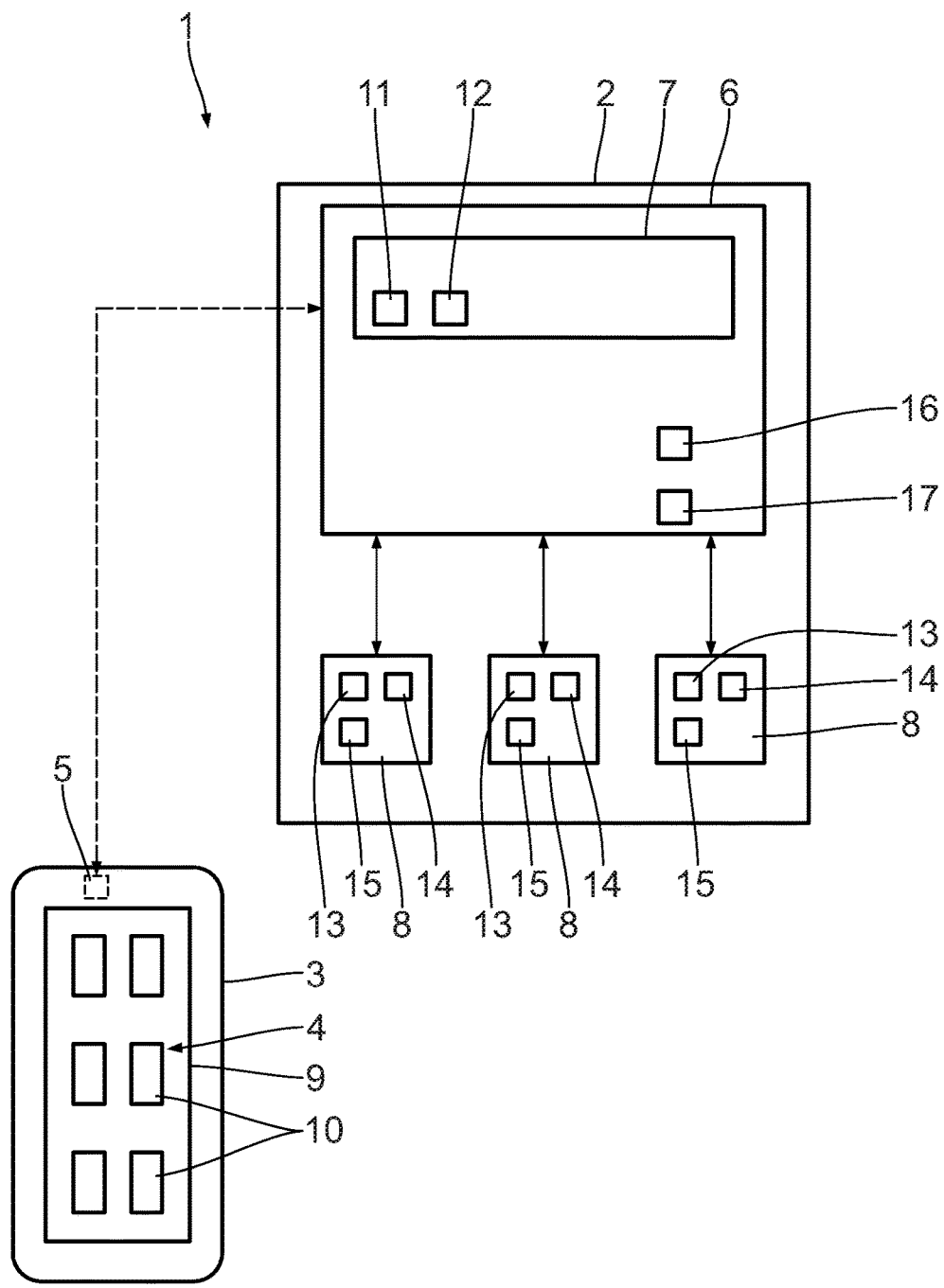

CONTROL SYSTEM FOR A CRANE

CROSS-REFERENCES TO RELATED APPLICATIONS

This application claims the priority of German Patent Application, Serial No. 10 2016 201 713.6, filed Feb. 4, 2016, pursuant to 35 U.S.C. 119(a)-(d), the content of which is incorporated herein by reference in its entirety as if fully set forth herein.

FIELD OF THE INVENTION

The invention relates to a control system for a crane and to a crane with a control system of such a type, and also to a method for controlling a crane.

BACKGROUND OF THE INVENTION

A remote-control system is known from WO 2014/041 022 A2 and DE 101 29 189 A1. A remote control system for a crane is known from DE 20 2006 017 719 U1 and EP 2 489 625 A1. For the purpose of operating the remote-control system a special operating unit is required which, in particular, is matched to the machine to be operated.

SUMMARY OF THE INVENTION

One object of the present invention consists in making available a control system that simplifies the operation of the crane and enhances safety.

This object is achieved with a control system according to the invention for a crane comprising a mobile terminal, with pre-installed application software for entering a control command for a crane and with a transmitting module for transmitting the control command, a control unit with a receiving module which is suitable for receiving the control command and is capable of being brought into signal linkage with the mobile terminal, the signal linkage being wireless, and at least one crane module in signal linkage with the control unit, for executing the control command.

The mobile terminal is in particular an electronic terminal for mobile, network-independent communication, particularly for data, voice and/or image communication as well as navigation. The mobile terminal is all-purpose, particularly for telecommunication and data processing. Mobile terminals are widely spread. By installation of the application software the mobile terminal can be made accessible for crane control. It is not required to acquire a special control panel. Investments are reduced. The mobile terminal is familiar to the crane operator. Acceptance is increased. The use of the mobile terminal is not limited to the control of a crane.

In particular, it has been recognized that it is possible to replace a special operating unit with a mobile terminal. An operating unit with an interface for a portable computer according to EP 2 489 625 A1 is expendable. Mobile terminals are available nowadays in numerous forms. By virtue of the pre-installed application software, a so-called application (app for short), a crane-operator is able to make the mobile terminal ready for controlling the crane. In particular, a commercially available smartphone with the installed app can be utilized for controlling the crane. In particular, the pre-installed software is realized in user-friendly manner and exhibits user interfaces that are comprehensible to the crane-operator. No special knowledge as regards the control software is required for operating the crane. The pre-installed software can be operated intuitively. The expenditure on components for the control of the crane has been reduced by the omission of the special operating unit. In the event of a brief failure of the mobile terminal, the latter can be replaced by another available mobile terminal with pre-installed software. Downtimes of the crane as a consequence of an unavailable operating unit are reduced. The operator is not tied to an operating location and is able to seek out an optimal operating location, as a result of which the safety of the operation of the crane is enhanced.

Advantageously, the control command entered in the application software is executed by the at least one crane module, as a result of which the control command is converted into a crane function, in particular a crane-rigging function. A crane module is, for example, a movable—in particular, drivable—crane component, such as, for example, traversing drives, in particular wheel drives or crawler drives. Further crane modules may be rotary drives for a rotary motion of a superstructure in relation to an undercarriage. Further crane modules are, in particular, for example, cable winches for a hoist and/or for erecting jibs, hydraulic cylinders for erecting jibs, drives for telescopic jibs, drives for support devices which, in particular, exhibit hydraulic-cylinder props. With the aid of an inclination sensor the hydraulic-cylinder props can also be utilized for the purpose of levelling the crane.

By a "crane" in this application, all types of crane are to be understood, in particular vehicle cranes as well as crawler cranes.

In a preferred embodiment the mobile terminal comprises a indication and input module for displaying the application software and for entering a control command. The indication and input module is integrated into the mobile terminal. The entry of the control command takes place by the crane controller through the application software displayed on the indication and input module. Advantageously, the indication and input module is a display, in particular touch screen, on which on the one hand the application software is displayed and on the other hand the entry of a selected control command takes place via touching the display surface by the crane controller.

A control system, in which the control unit is arranged on the crane, in particular integrated on the crane, makes available a structurally advantageous embodiment of a control system. In particular, the control unit is integrated on the crane.

In the case of a control system, in which the receiving module exhibits a radio interface which, in particular, is realized as a WLAN interface, mobile-radio interface, Bluetooth interface or USB interface, a cost-efficient signal linkage is made available. In particular, the radio interface is realized as a WLAN interface, Bluetooth interface or USB interface.

In the case of a control system, in which the receiving module is suitable for receiving several control commands, in particular simultaneously, an efficient control of the crane is guaranteed. In particular, the receiving module is suitable for simultaneous reception of several control commands. The control unit is realized in such a manner that several control commands, in particular received simultaneously, are stored temporarily and executed in accordance with a predeterminable, adjustable sequence. In particular, the sequence is defined on the basis of definable priority criteria, in order to guarantee a sensible operation of the crane. For example, it is clear that, for the purpose of supporting the undercarriage of the crane, supporting beams firstly have to be either extended horizontally or swivelled out before support cylinders for supporting on the ground are extended.

In the case of a control system, in which the mobile terminal is realized as a smartphone or as a tablet computer, a universally deployable mobile terminal is made available. Smartphones or tablet computers are in widespread use.

In the case of a control system, in which the mobile terminal is suitable for Internet connection, in particular for mobile Internet connection and in which the receiving module is suitable for Internet connection, in particular for mobile Internet connection, a flexible signal linkage is made available. In particular, the signal linkage is substantially distance-independent. The crane-operator with the mobile terminal may be located at a relatively large distance from the crane.

In the case of a control system comprising an identification unit, which, in particular, is integrated into the receiving module of the control unit, for identifying the control command, it is ensured that the control command assigned to the crane is identified and put into effect. In particular, the identification unit serves for identifying the mobile terminal—that is to say, the crane-operator—in order to exclude the possibility of unauthorized third parties operating the crane. The safety of the operation of the crane is enhanced as a result. In particular, the identification unit has been integrated into the receiving module of the control unit. The identification can be undertaken, for example, via an input code, a device ID and/or a SIM ID.

In the case of a control system, in which the at least one crane module exhibits a positioning element and a functional element, a particularly advantageous embodiment of the crane module is made available. Advantageously, the positioning element is realized, for example, as a drive unit, and the functional element, for example, as a winch.

In the case of a control system, in which the at least one crane module exhibits a sensor element, a safe operation of the crane is improved further. In particular, the at least one sensor element is suitable for detecting, for example, the temperature, pressure, speed or position of the crane module. As a result, it is guaranteed that the crane function executed by the crane module can be monitored directly. The sensor element is, in particular, in signal linkage with the control unit. In particular, the control unit is in signal linkage with the mobile terminal for the purpose of echoing information, so that, in particular, a monitoring display directly on the mobile terminal may have been provided for the purpose of representing the monitoring function on the mobile terminal. For example, temperature, pressure, speed or position of the crane module can be displayed on the mobile terminal.

Advantageously, the data detected by the at least one sensor element can be transmitted to the mobile terminal.

In the case of a control system, in which the signal linkage between the control unit and the at least one crane module is realized as a CAN bus, a particularly efficient control system is made available.

A further object of the present invention consists in making available a crane with a control system.

This object is achieved by a crane with a control system according to the invention. By this means, a crane is made available that can be operated in particularly straightforward manner.

A further object of the present invention consists in making available an improved method for controlling a crane.

This object is achieved by a method for controlling a crane, comprising the following method steps:

entering a control command into a mobile terminal by means of application software, communicating the control command from the mobile terminal to a control unit, receiving the control command by means of a receiving module of the control unit, executing the control command by means of at least one crane module in signal linkage with the control unit.

In the case of the method according to the invention, it has been recognized that when entering a control command into a mobile terminal by means of application software the operator is not tied to an operating location, so the operator can seek out an optimal operating location, as a result of which the safety of the operation of the crane is enhanced. Advantageously, the entry of the control command takes place via provided operation and selection menus of the application software. Advantageously, the at least one control command is entered by selection of at least one operation and selection menu. Preferably, the selection takes place by touching the provided operating and selection menu and/or by voice entry of the control command. A gesture control is possible so that a control signal is generated when the operating person has performed a required gesture.

In the case of a method, in which prior to the execution of the control command a security inquiry is undertaken, in particular by identification of the mobile terminal and/or of a person operating the mobile terminal, it is ensured that only authorized persons are able to control the crane. In particular, a security inquiry is undertaken in the form of an identification of the mobile terminal and/or an identification of a person operating the mobile terminal.

Advantageously, the identification is undertaken by input of an identification number or a PIN, and/or by scanning a QR code or a barcode. It is also possible that the mobile terminal is recognized automatically, for example on the basis of the serial number and/or a SIM ID.

In the case of a method, in which the execution of the control command includes the conversion into a crane function, in particular a crane-rigging function, a particularly advantageous method for controlling a crane is made available. In particular, the execution of the control command includes the conversion into a crane-rigging function.

Advantageously, the at least one sensor element is suitable to monitor the conversion of the control command into a crane function.

An exemplary embodiment of the invention will be elucidated in more detail in the following on the basis of the drawing.

BRIEF DESCRIPTION OF THE DRAWING

FIG. 1 shows a schematic representation of a control system.

DESCRIPTION OF THE PREFERRED EMBODIMENT

A control system 1 represented schematically in FIG. 1 serves for remote-controlled operation of a crane 2 represented schematically. The control system 1 includes a mobile terminal 3 with pre-installed application software 4 and with a transmitting module 5. The mobile terminal 3 is capable of being brought into communication linkage with a receiving module 7 of a control unit 6 of the crane 2 via a wireless signal link. The communication linkage is bidirectional and enables a communication from the transmitting module 5 of the mobile terminal 3 to the receiving module 7 of the control unit 6, and conversely. The control unit 6 is arranged on the crane 2, in particular integrated within the crane 2. The control unit 6 is in signal linkage with at least one crane module 8.

The mobile terminal 3 is realized, for example, as a smartphone or tablet computer. The mobile terminal 3 includes an indicator 9 in the form of a display, in particular a touch-sensitive display, for representing the application software 4. The application software 4 comprises several operating menus and selection menus 10 for selecting at least one control command. The selection of a control command may also be undertaken in voice-controlled manner. The operating menus and selection menus 10 are suitable, for example, for displaying the orientation and/or position of at least one crane module 8 and/or for selecting at least one operating mode, such as, for example, traversing mode, lifting/lowering mode. Depending on the selection of one or more operating menus and selection menus 10, at least one control command is made available for selection. Advantageously, the operating menus and selection menus 10 are represented as graphical symbols, so that the application software 4 has been designed to be easily grasped and can be operated intuitively, as a result of which the ease of operation is improved further. By touching the display 9, on which the operation and selection menu 10 is displayed, the at least one control command is selected. The at least one control command selected via the application software 4 is communicated by the transmitting module 5 to the receiving module 7. The transmitting module 5 is also suitable for receiving data. The mobile terminal 3 is suitable for Internet connection, in particular for mobile data-network connection.

The receiving module 7 is integrated within the control unit 6. Alternatively, the receiving module 7 may also have been realized separately from the control unit 6. In this case, the receiving module 7 would be in communication linkage with the control unit 6 via a data bus. The receiving module 7 is suitable for receiving at least one control command. The receiving module 7 is preferentially suitable for simultaneous reception of several control commands. The receiving module is suitable for Internet connection, in particular for mobile Internet connection. The receiving module 7 exhibits a radio interface 11. The radio interface 11 is realized as a WLAN interface or mobile-radio interface and/or Bluetooth interface or USB interface. If the radio interface 11 has been realized as a WLAN interface or as a mobile-radio interface, the receiving module 7 can establish an Internet connection, in particular a mobile Internet connection. If the radio interface 11 has been realized as a Bluetooth interface or USB interface, the receiving module can be connected to a local network. The receiving module 7 is preferentially suitable to transmit data to the mobile terminal 3.

The receiving module 7 further includes an identification unit 12 for identifying the control command and also for identification of the mobile terminal 3 and/or for identification of a person operating the mobile terminal 3. The identification module is integrated within the receiving module. The identification of a control command can be undertaken, for example, via an input code, a device ID and/or a SIM ID. The identification of a person operating the mobile terminal 3 can be undertaken by input of an identification number or a PIN and/or by scanning a QR code or a barcode.

The control unit 6 is in communication linkage with at least one crane module 8 via a CAN bus. The communication linkage is bidirectional. A crane module 8 includes a positioning element 13 and a functional element 14, which convert the control commands into a crane function, in particular a crane-rigging function. The crane module 8 further exhibits at least one sensor element 15 for detecting, for example, the temperature, pressure, speed, orientation and/or position of the crane module 8. By virtue of the signal linkage of the at least one sensor element 15 with the control unit 6, the respectively current state of the crane module 8 is transmitted to the control unit 6. By means of the sum of the states of the individual crane modules 8, the operating state of the crane 2 can be ascertained. Both the individual states of the crane modules 8 and the operating state of the crane 2 can be transmitted to the mobile terminal 3 and displayed by the application software 4. For the purpose of data processing, a control/regulation element 16 and a memory element 17 are provided in the control unit 6.

In the following, a method for operating the control system 1 will be elucidated in more detail. Firstly, a wireless signal linkage between the mobile terminal 3 and the control unit 6 of the crane 2 is made available. The wireless signal linkage is preferentially made available via the Internet, in particular via the mobile Internet. For this purpose it is necessary that the application software 4 is synchronized with the control unit 6. This is preferentially undertaken by input of an identification number or a PIN or by scanning a QR code or barcode on start-up of the application software 4. For the purpose of entering a control command by means of the application software 4, several operating menus and selection menus 10 are made available. By selection of one or more operating menus and selection menus 10, one or more control commands can be selected. The at least one control command is transmitted by the transmitting module 5 to the receiving module 7 in wireless manner. The transmission is preferentially undertaken via the Internet, in particular via the mobile Internet. Subsequently the control command is processed by the control/regulation element 16 and the memory element 17 of the control unit 6. Subsequently the respective control command is relayed from the control unit 6 to the respective crane module 8. Thereupon the positioning element 13 and the functional element 14 of the crane module 8 convert the control command into a crane function, in particular a crane-rigging function.

Advantageously, prior to execution of the control command a security inquiry is undertaken, in particular in the form of an identification of the mobile terminal 3 and/or an identification of a person operating the mobile terminal 3. For the purpose of enabling the control command, an input of an identification number or a PIN is required. The input is undertaken via the application software 4.

For the purpose of monitoring the conversion of the control command into a crane function, in particular a crane-rigging function, the control unit 6 can detect an actual configuration of the crane. This is undertaken, in particular, by the operating state of the crane 2 being detected. The operating state of the crane 2 takes into consideration, in particular, the criteria such as orientation and position of the crane modules 8 and also the operating mode of the crane 2, such as, for example, traversing mode, lifting/lowering mode, rotating mode or other modes. The orientation and/or position of the crane modules 8 can be represented in the application software 4.

It is also possible that limiting values for selected operating states of the crane modules 8 are saved in the memory element 17 of the control unit 6, which are equilibrated with the actual configuration of the crane. Should the actual configuration of the crane approach at least one limiting value, a warning is communicated to the application software 4 and displayed, whereupon the operator can react appropriately. The warning can be effected visually or acoustically. When the limiting value is attained or exceeded, the execution of the control command is terminated automatically. By this means, the safety of the operation of the crane is improved further.

The control system 1, in particular the mobile terminal 3, enables a flexible crane-independent deployment. By this means, manufacturer-specific remote controls can be dispensed with. In particular, it is not necessary for the hardware to be reconfigured or for software to be reprogrammed. Advantageously, the receiving module 7 includes a standard interface for connection to the control unit 6.

What is claimed is:

1. A crane with a control system for the crane comprising:
   a mobile terminal, the mobile terminal comprising one of a smartphone or a tablet computer with pre-installed application software for entering a control command for the crane and with a transmitting module for transmitting the control command,
   a control unit arranged on the crane, and having a receiving module which is configured to receive the control command and is configured to being brought into signal linkage with the mobile terminal, the signal linkage being wireless, wherein the receiving module exhibits a radio interface, and wherein the radio interface comprises one of a WLAN interface, a mobile-radio interface, a Bluetooth interface or a USB interface, and
   at least one crane module in signal linkage with the control unit for executing the control command wherein the at least one crane module comprises a positioning element and a functional element,
   an identification unit integrated into the receiving module of the control unit for identifying the control command and for identifying one of the mobile terminals and a person operating the mobile terminal.

2. The crane according to claim 1, wherein the receiving module (7) is suitable for receiving several control commands.

3. The crane according to claim 1, wherein the receiving module is configured to receive several control commands simultaneously.

4. The crane according to claim 1, wherein the mobile terminal is configured for Internet connection.

5. The crane according to claim 1, wherein the receiving module is configured for Internet connection.

6. The crane according to claim 1, comprising an identification unit.

7. The crane according to claim 1, wherein the at least one crane module comprises a sensor element.

8. The crane according to claim 1, wherein the signal linkage between the control unit and the at least one crane module comprises a CAN bus.

9. A method for controlling a crane, the crane having a control system, the crane comprising a mobile terminal, the mobile terminal comprising one of a smartphone or a tablet computer with pre-installed application software for entering a control command for a crane and with a transmitting module for transmitting the control command, a control unit arranged on the crane, and having a receiving module which is configured to receive the control command and is configured to being brought into signal linkage with the mobile terminal, the signal linkage being wireless, wherein the receiving module comprises a radio interface, and wherein the radio interface comprises one of a WLAN interface, a mobile-radio interface, a Bluetooth interface or a USB interface, and at least one crane module in signal linkage with the control unit for executing the control command, wherein the at least one crane module comprises a positioning element and a functional element, wherein an identification unit is integrated into the receiving module of the control unit for identifying the control command and for identifying one of the mobile terminal and a person operating the mobile terminal, wherein the execution of the control command includes conversion of the control command into a crane function.

* * * * *